(12) United States Patent
Leung et al.

(10) Patent No.: US 7,215,461 B1
(45) Date of Patent: May 8, 2007

(54) MEMS DEVICES WITH INCREASED DAMPING FOR SUSPENDED MOVABLE STRUCTURES

(75) Inventors: Omar S. Leung, Palo Alto, CA (US); Alexander P. Payne, Ben Lomondo, CA (US)

(73) Assignee: Silicon Light Machines Corporation, San Jose, CA (US)

( * ) Notice: Subject to any disclaimer, the term of this patent is extended or adjusted under 35 U.S.C. 154(b) by 76 days.

(21) Appl. No.: 11/213,135

(22) Filed: Aug. 26, 2005

Related U.S. Application Data

(60) Provisional application No. 60/609,733, filed on Sep. 14, 2004.

(51) Int. Cl.
*G02B 26/00* (2006.01)
*G02B 27/44* (2006.01)

(52) U.S. Cl. .............. 359/291; 359/295; 359/298; 359/318; 359/566; 359/567; 359/572; 359/573; 359/576

(58) Field of Classification Search .......... 359/223, 359/224, 290–292, 295, 298, 318, 566, 567, 359/569, 572, 573, 576
See application file for complete search history.

(56) References Cited

U.S. PATENT DOCUMENTS

| | | | |
|---|---|---|---|
| 6,215,579 B1 | 4/2001 | Bloom et al. | |
| 6,268,952 B1 | 7/2001 | Godil et al. | |
| 6,445,502 B1 | 9/2002 | Islam et al. | |
| 6,479,811 B1 * | 11/2002 | Kruschwitz et al. | 359/573 |
| 7,099,064 B2 * | 8/2006 | Hong et al. | 359/290 |
| 7,149,028 B2 * | 12/2006 | Yun | 359/290 |
| 2003/0035215 A1 | 2/2003 | Amm et al. | |
| 2003/0058514 A1 * | 3/2003 | Kruschwitz et al. | 359/558 |
| 2005/0105157 A1 * | 5/2005 | Yun et al. | 359/212 |
| 2005/0243401 A1 * | 11/2005 | Yun | 359/291 |
| 2005/0243403 A1 * | 11/2005 | Yun | 359/291 |
| 2005/0264888 A1 * | 12/2005 | An et al. | 359/572 |
| 2006/0078247 A1 * | 4/2006 | Lee et al. | 385/14 |

OTHER PUBLICATIONS

Corrigan, Robert, et al. "Silicon Light Machines—Grating Light Valve Technology Brief", Jun. 2001, pp. 1-8; Silicon Light Machines, Sunnyvale, California.

(Continued)

*Primary Examiner*—Evelyn A. Lester
(74) *Attorney, Agent, or Firm*—Okamoto & Benedicto LLP

(57) ABSTRACT

In one embodiment, a light modulator includes a substrate and a number of modulator elements disposed above and spaced apart from the substrate. Each modulator element has an optically active portion adapted to receive light incident thereon, and a support portion on either side of the active portion to support the modulator element above the substrate. The modulator elements include at least one deflectable modulator element. To shorten damping time, the deflectable modulator element has a lower surface in the support portion that is closer to the substrate than a lower surface under the optically active portion.

20 Claims, 16 Drawing Sheets

OTHER PUBLICATIONS

Amm, D.T., et al. "Grating Light Wave Technology: Update and Novel Applications" May 19, 1998, pp. 1-4; Presented at Society for Information Display Symposium, Anaheim, California.

Amm, David T., et al. "Optical Performance of the Grating Light Valve Technology" 1999, pp. 1-8; Silicon Light Machines, Sunnyvale, California.

Corrigan, R.W., et al. "an Alternative Architecture for High Performance Display" Nov. 20, 1999, pp. 1-5; Presented at the 141st SMPTE Technical Conference and Exhibition, New York, NY.

Bloom, D.M., et al. "The Grating Light Valve: revolutionizing display technology" 1997, pp. 1-10; Silicon Light Machines, Sunnyvale, California.

Corrigan, R.W., et al. "Calibration of a Scanned Linear Grating Light Valve™ Projection System", May 18, 1999, pp. 1-4; Presented at Society for Information Display Symposium, San Jose, California.

* cited by examiner

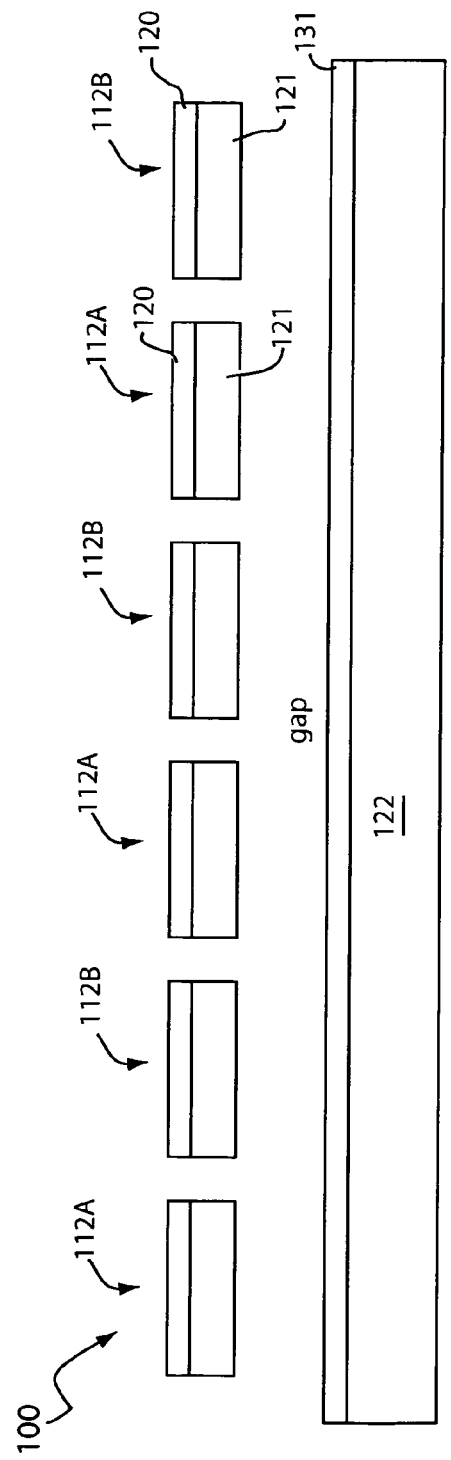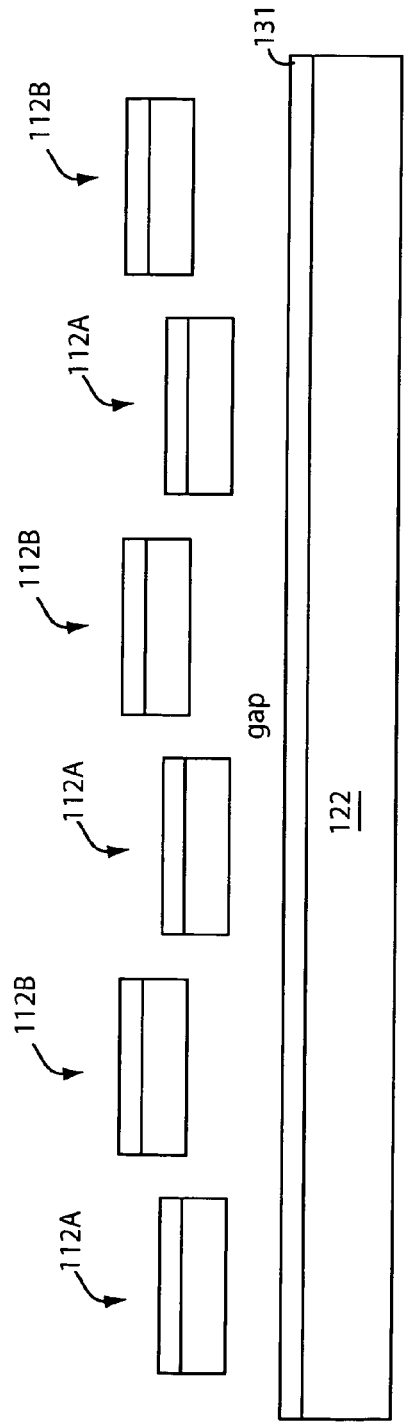

Damping Time Tau

$$\tau = \frac{\pi^3 \rho t G^3}{48 \, \eta_{\textit{eff}} w^2}$$

G  - Gap thickness
ρ  - Ribbon density
t  - Ribbon thickness
w  - Ribbon width
$\eta_{\text{eff}}$ - Gas effective viscosity

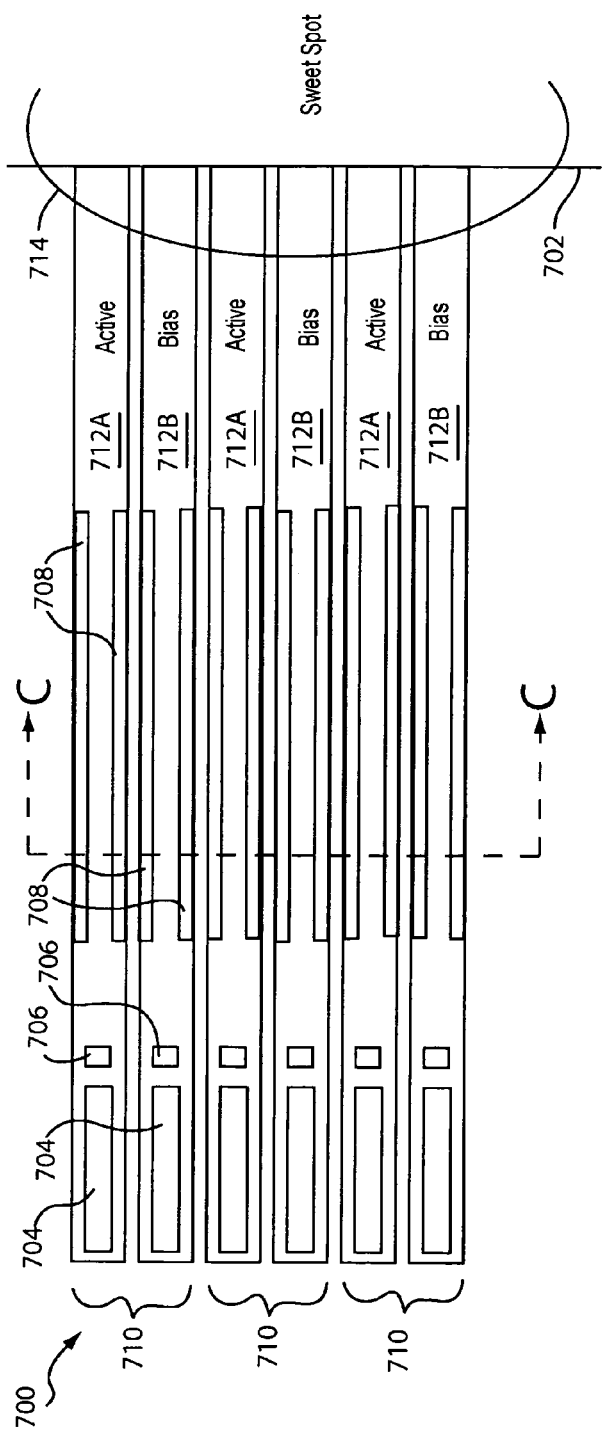
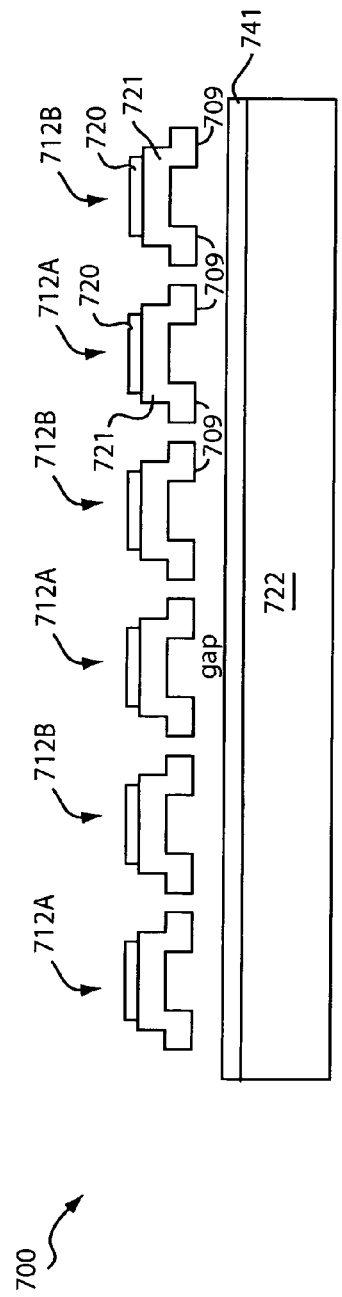
FIG. 8A
FIG. 8B

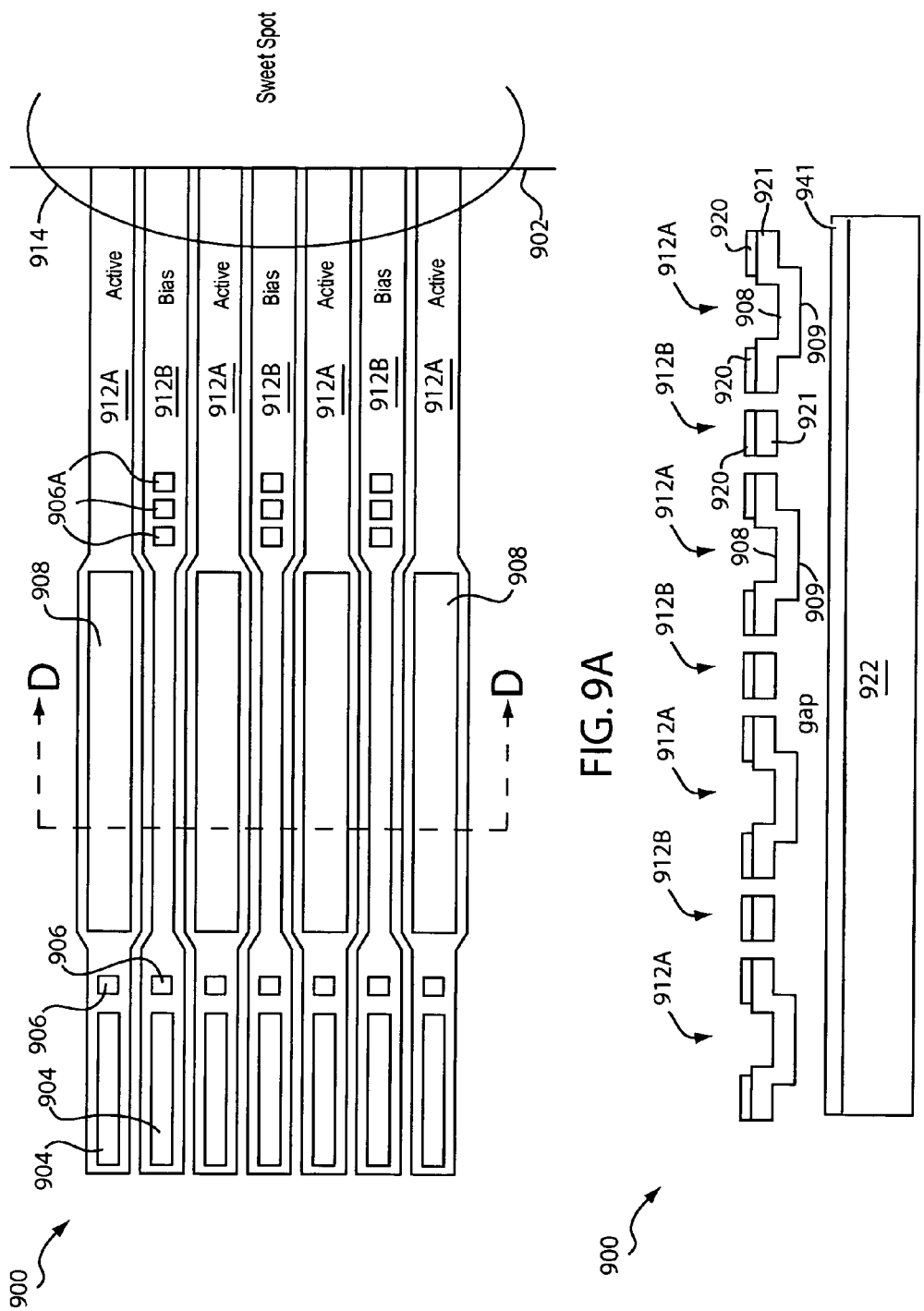

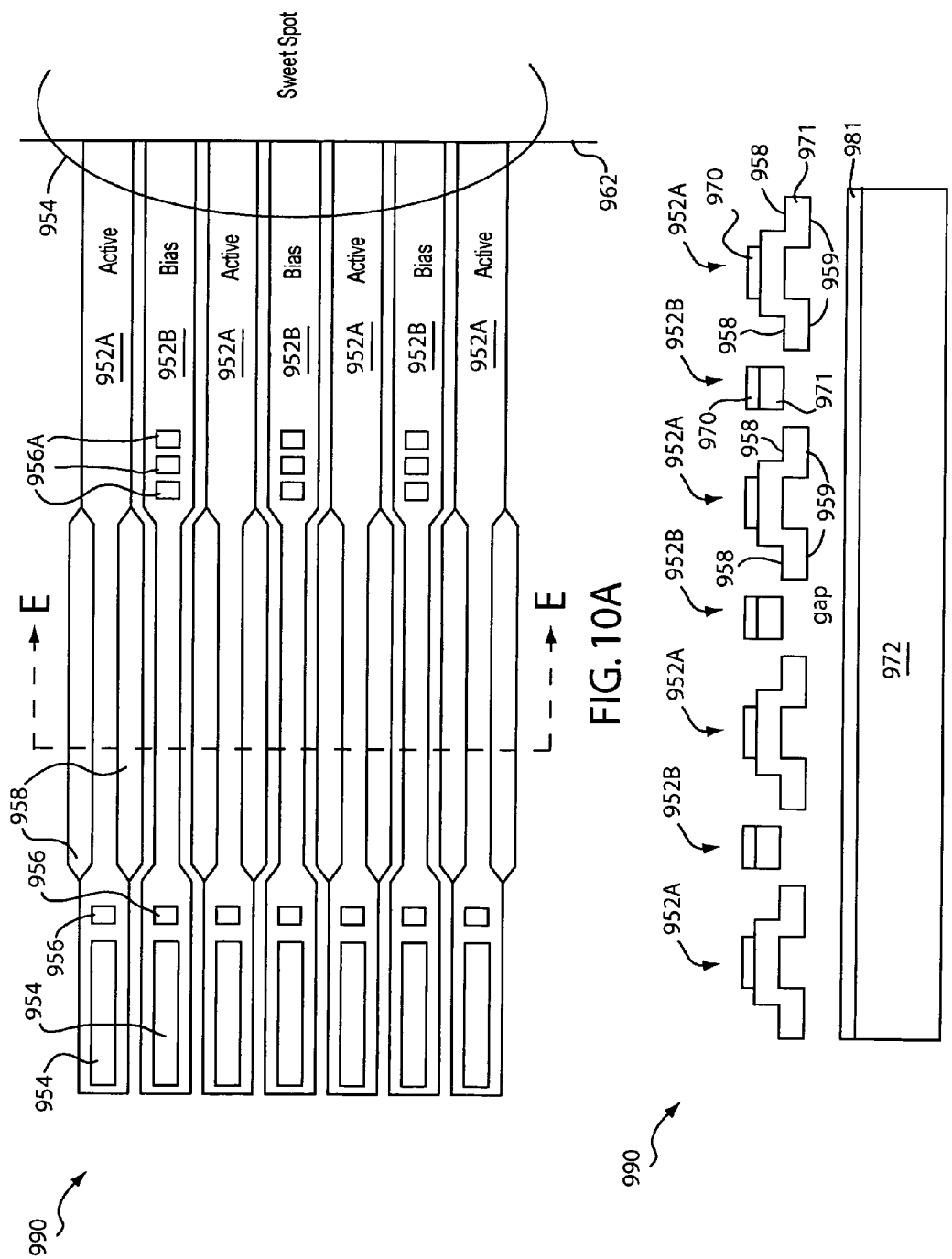

MEMS DEVICES WITH INCREASED DAMPING FOR SUSPENDED MOVABLE STRUCTURES

CROSS-REFERENCE TO RELATED APPLICATION

This application claims the benefit of U.S. Provisional Application No. 60/609,733, filed Sep. 14, 2004, which is incorporated herein by reference in its entirety.

BACKGROUND OF THE INVENTION

1. Field of the Invention

The present invention relates generally to micro electromechanical systems (MEMS), and more particularly but not exclusively to MEMS light modulators.

2. Description of the Background Art

MEMS devices typically include micro mechanical structures that may be actuated using electrical signals. MEMS devices may be employed in various applications including light modulation for printing, video display, optical networks, and maskless lithography. Example MEMS light modulators include the Grating Light Valve™ (GLV™) light modulators available from Silicon Light Machines, Inc. of Sunnyvale, Calif. (Grating Light Valve™ and GLV™ are trademarks of Silicon Light Machines). A light modulator may employ movable ribbon-like structures. A ribbon may be deflected to modulate light incident thereon.

FIG. 1A schematically shows a top view of a portion of a conventional ribbon-type diffractive spatial light modulator 100. Light modulator 100 includes ribbon pairs 110, with each ribbon pair 110 consisting of a deflectable active ribbon 112A and a stationary bias ribbon 112B. In some applications, 3 ribbon pairs 110 are employed to represent one pixel of information (e.g. a pixel of a video image). The ribbons 112 (i.e. 112A and 112B) are symmetrical about a symmetry line 102. The right hand portion of the ribbons 112 are not shown for clarity of illustration. In operation, a light source illuminates the optically active area 114 of the ribbons 112. The optically active area is also referred to as a "sweet spot" as it is the portion of the ribbons 112 configured to be illuminated by a light source. In the example of FIG. 1A, active ribbons 112A are configured to deflect, while bias ribbons 112B are configured to remain relatively stationary or fixed. Light modulator 100 represents a particular implementation where the ribbons are used as modulator elements, as opposed to embodiments wherein the ribbons and the gaps between the ribbons are used as the modulating elements.

FIG. 1B schematically shows a side cross-sectional view of the light modulator 100 taken at section A—A of FIG. 1A. Each ribbon 112 (i.e. 112A or 112B) comprises a reflective material 120 supported by a resilient structure 121. A gap separates the ribbons 112 from the substrate 122. On top of the substrate is a drive electrode 131, also referred to as a "bottom electrode." The reflective materials 120 may be configured as actuator electrodes, also referred to as "top electrodes." Applying a potential difference between the drive electrode 131 and the actuator electrodes creates an electrostatic force that deflects the actuator electrodes toward the substrate 122.

FIG. 1C schematically shows the ribbons 112 of FIG. 1B when the active ribbons 112A are actuated. As shown in FIG. 1C, a height difference between adjacent ribbons can be changed by controllably deflecting the active ribbons 112A towards the substrate 122 by up to about $9\lambda/4$ and more typically about $5\lambda/4$, where $\lambda$ is the wavelength of the incident light. If, upon reflection, the light from adjacent ribbons is in phase, then the $0^{th}$ order light reflection is effectively maximized and the light modulator 100 is in an ON state. To minimize the $0^{th}$ order light reflection; the active ribbons 112A are deflected by an odd multiple of the wavelength. When the $0^{th}$ order light reflection is minimized, the light modulator 100 is in an OFF state. The ribbons 112A may be actuated such that the light modulator 100 is ON, OFF, or in between to modulate incident light.

The speed of currently available devices employing ribbon-type diffractive spatial light modulators is limited by damping time "T" (tau), which is the time required for a ribbon to transition from an OFF state to an ON state, or from a first deflected state to an undeflected or a second deflected state. FIG. 2 shows a graph 200 illustrating the impact of damping time on transition from an OFF state to an ON state in a conventional ribbon-type spatial light modulator, such as light modulator 100. Plot 204 shows a simulated response of a conventional ribbon-type spatial light modulator having a response time of about 4 microseconds, while plot 202 shows the simulated response of a conventional ribbon-type spatial light modulator having a response time of about 6 microseconds. As shown in FIG. 2, the transition from OFF to ON (region I to II) results in oscillation such that the integrated intensity is lower in region II than in region III for both plots 204 and 202. Thus, the minimum pulse time for the transition (i.e. the maximum speed of the device) is limited by the maximum allowable variation.

FIG. 3 shows a diagram and a formula illustrating the impact of various characteristics of a ribbon-type diffractive spatial light modulator on damping time. The factors that affect damping time include: gap thickness (G) that is the distance separating a lower surface of the ribbon from an upper surface of the supporting substrate; ribbon density ($\rho$); ribbon thickness (t); ribbon width (w); and the gas effective viscosity ($\eta_{eff}$) of gas enveloping the light modulator and filling spaces between the ribbons and substrate. As the gas becomes more viscous, the damping time is increased. Although many, if not all, of these factors can be optimized for speed (i.e. to minimize damping time), there is typically a compromise of other device performance parameters including wavelength of modulated light, illumination efficiency or fill-factor, diffraction angle, die or modulator size, sweet spot size, snap-down margin, or operating voltages. FIG. 4 shows a chart illustrating the tradeoff between optimization of speed realized through decreased damping time and spatial light modulator performance in a conventional ribbon type spatial light modulator.

SUMMARY

In one embodiment, a light modulator includes a substrate having an upper surface and a number of modulator elements disposed above the upper surface of the substrate and in spaced apart relation thereto. Each modulator element has an optically active portion adapted to receive light incident on the light modulator and a support portion on either side of the optically active portion to support the modulator element above the substrate. The modulator elements include at least one deflectable modulator element having a lower surface in the support portion at least a section of which is separated in an undeflected state from the upper surface of the substrate by a gap distance less than that of a lower surface of the optically active region. Generally, the substrate further includes a bottom or drive electrode, the deflectable modulator element further includes a top or actuator electrode on a top surface thereof, and the light modulator further includes a means for applying an electrostatic force between the drive and actuator electrodes to deflect the deflectable modulator element relative to the upper surface of the substrate.

In one embodiment, the support portion of the deflectable modulator element further includes at least one projection extending from the lower surface thereof, and the section of the lower surface that is separated by a gap distance less than the lower surface of the optically active region is on the projection. Preferably, the support portion of the deflectable modulator element further includes at least one depression or indentation in the top surface thereof, and the depression is located and sized to complement the projection. More preferably, the projection and depression are located and sized relative to one another to maintain a substantially constant average cross-sectional thickness across a width of the deflectable modulator element in the support portion. Most preferably, the actuator electrode on the top surface of the deflectable modulator element does not extend into or cover the depression, thereby substantially eliminating snap down of the deflectable modulator element under normal operating conditions.

In one embodiment, the projection includes a single central projection with a long axis parallel to the long axis of the deflectable modulator element, and the complementary depression includes a single central depression also having a long axis parallel with that of the deflectable modulator element. In one version of this embodiment, the modulator elements include at least one stationary or bias modulator element, and the support portion of the bias modulator element further includes a cross-sectional thickness across a width thereof less than that of the deflectable modulator element.

In one embodiment, the projection includes a pair of projections proximal to sides of the deflectable modulator element, the pair of projections having long axes parallel with the long axis of the deflectable modulator element to define two projecting or lowered portions of the lower surface in the support portion along sides thereof. The support portion of the deflectable modulator element may further include a pair of depressions proximal to sides of the deflectable modulator element located and sized to complement the pair of projections. The modulator elements may also include at least one stationary or bias modulator element, and wherein the support portion of the bias modulator element further includes a cross-sectional thickness across a width thereof less than that of the deflectable modulator element.

These and other features of the present invention will be readily apparent to persons of ordinary skill in the art upon reading the entirety of this disclosure, which includes the accompanying drawings and claims.

DESCRIPTION OF THE DRAWINGS

FIGS. 1A, 1B, and 1C schematically show various views of an example conventional light modulator.

FIGS. 8A and 8B schematically show various views of a light modulator in accordance with a second embodiment of the present invention.

FIGS. 9A and 9B schematically show various views of a light modulator in accordance with a third embodiment of the present invention.

FIGS. 10A and 10B schematically show various views of a light modulator in accordance with a fourth embodiment of the present invention.

The use of the same reference label in different drawings indicates the same or like components. The drawings are not to scale unless otherwise noted.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 5A:
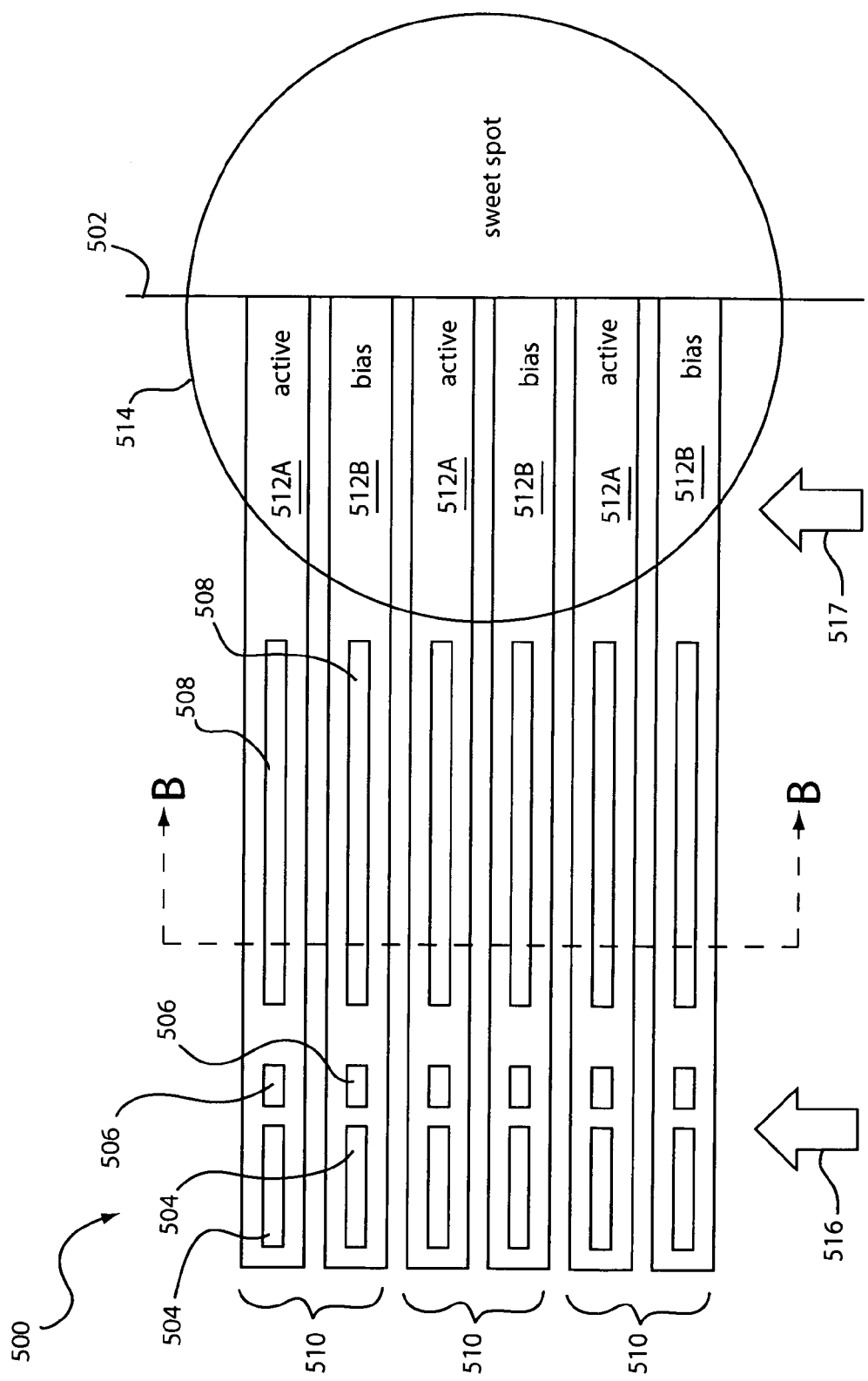
FIGS. 5A, 5B, 5C, 5D, and 5E schematically show various views of a light modulator in accordance with a first embodiment of the present invention.

Referring now to FIG. 5A, there is schematically shown a top view of a portion of a ribbon-type diffractive spatial light modulator 500 in accordance with an embodiment of the present invention. Light modulator 500 includes modulator elements in the form of ribbon pairs 510, with each ribbon pair 510 comprising a deflectable active ribbon 512A and a stationary bias ribbon 512B. In some applications, 3 ribbon pairs 510 are employed to represent one pixel of information (e.g. a pixel of a video image). The ribbons 512 (i.e. 512A and 512B) are symmetrical about a symmetry line 502. That is, a mirror image of the ribbons 512 extends to the right hand side of symmetry line 502. Portions of the ribbons 512 on the right hand side of symmetry line 502 are not shown for clarity of illustration. In operation, a light source illuminates the optically active area 514 of the ribbons 512. The optically active area is also referred to as a "sweet spot" as it is the portion of the ribbons 512 configured to be illuminated by a light source. Portions of the ribbons 512 not on the optically active area, such as depressions 508, are also referred to as "support portions" in that they support the optically active area 514 over the substrate.

In the example of FIG. 5A, active ribbons 512A are configured to deflect, while bias ribbons 512B are configured to remain relatively stationary or fixed. Active ribbons 512A and bias ribbons 512B typically have uniform dimensions and are covered with the same reflective material. The ribbons 512 also include long anchor regions 504, short anchor regions 506, and depressions 508. Anchor regions 504 and 506 secure the ribbons 512 to the substrate. As will be more apparent below, depressions 508 form corresponding projections 509 (see FIG. 5C) that reduce the gap between the bottom surface of the ribbons 512 and the substrate to reduce damping time. In light modulator 500, each depression 508 and projection 509 has a long axis that is substantially in parallel with a long axis of the ribbon 512.

Figure 5B:
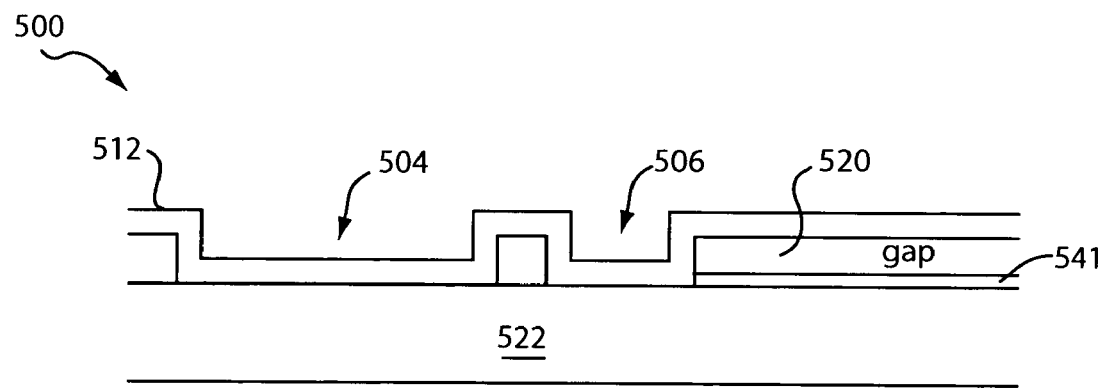

FIG. 5B schematically shows a side view of the light modulator 500 as seen in the direction indicated by an arrow 516 in FIG. 5A. As shown in FIG. 5B, portions of a ribbon 512 are suspended over substrate 522. A gap 520 is formed under the suspended portions of the ribbon 512 to allow the ribbon to deflect towards the substrate 522 in the case of an active ribbon 512A. Gap 520 is typically filled with gas formed during fabrication of the light modulator 500. In some embodiments, a reflective material formed on a top surface of the ribbon 512 serve as a top or actuator electrode. A bottom or drive electrode 541 is formed on the substrate 512. A potential difference may be applied between the actuator and drive electrodes to electrostatically deflect ribbons 512A toward the substrate 522.

Figure 5C:
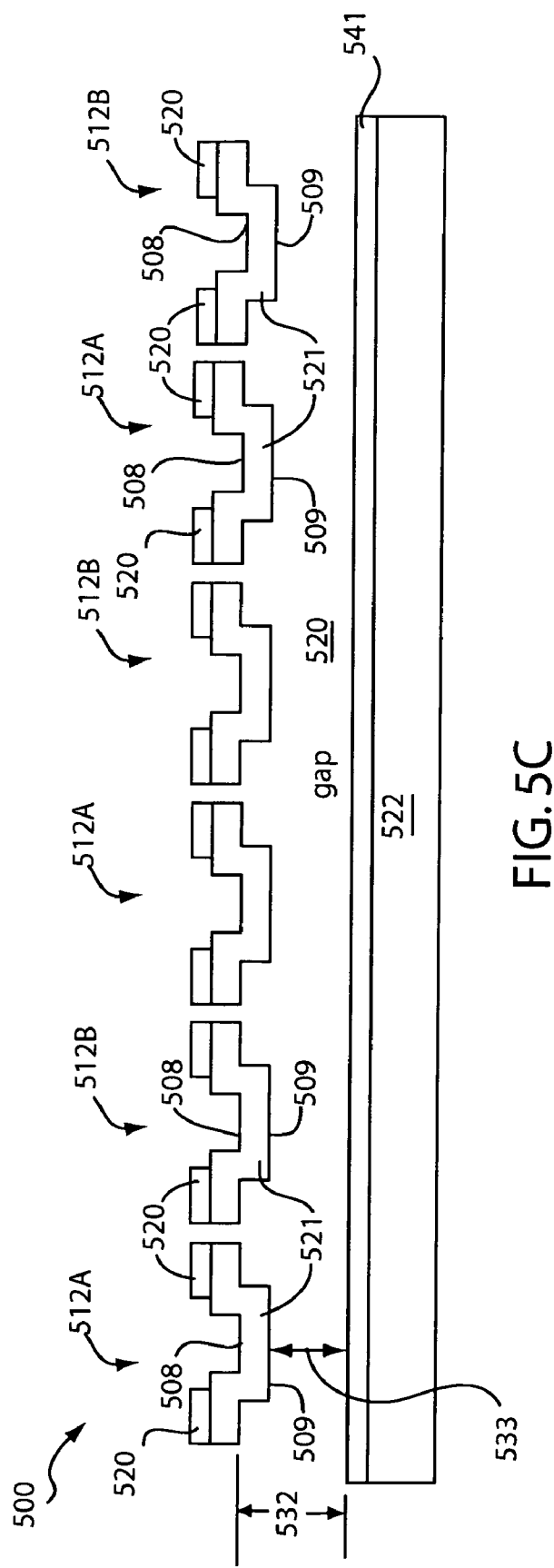

FIG. 5C schematically shows a side cross-sectional view of the light modulator 500 taken at section B—B of FIG. 5A. The ribbons 512A are in the undeflected state in FIG. 5C. Note that only some components shown in FIG. 5C are labeled for clarity of illustration. As shown in FIG. 5C, each ribbon 512 (512A or 512B) may comprise a reflective material 520 supported by a resilient structure 521. Reflective material 520 may comprise aluminum, while the resilient structure 521 may comprise silicon nitride. The gap 520 separates the ribbons 512 from the substrate 522. On top of the substrate 522 is the drive electrode 541. The reflective materials 520 may be configured as actuator electrodes. Applying a potential difference between the drive electrode 541 and the reflective materials 520 creates an electrostatic force that deflects the active ribbons 512A toward the substrate 522. In one embodiment, each active ribbon 512A is moved less than about ⅓ of the distance 532 between the lower surface of the ribbon 512A and the bottom portion of the gap 520, which is the top surface of the drive electrode 541 in this example. The distance 532 may be about 1 µm, for example. In that case, a projection 509 may formed such that the distance 533 is about 0.31 µm, for example.

Still referring to FIG. 5C, each depression 508 may have a complementary projection 509 that makes the lower surface of a ribbon 512 in the support portions closer to the substrate. The projections 509 reduce the gap distance under the resilient structures 521, thereby advantageously shortening damping time. In one embodiment, each resilient structure 521 comprises a single layer of resilient material, such as silicon nitride.

Figure 5D:
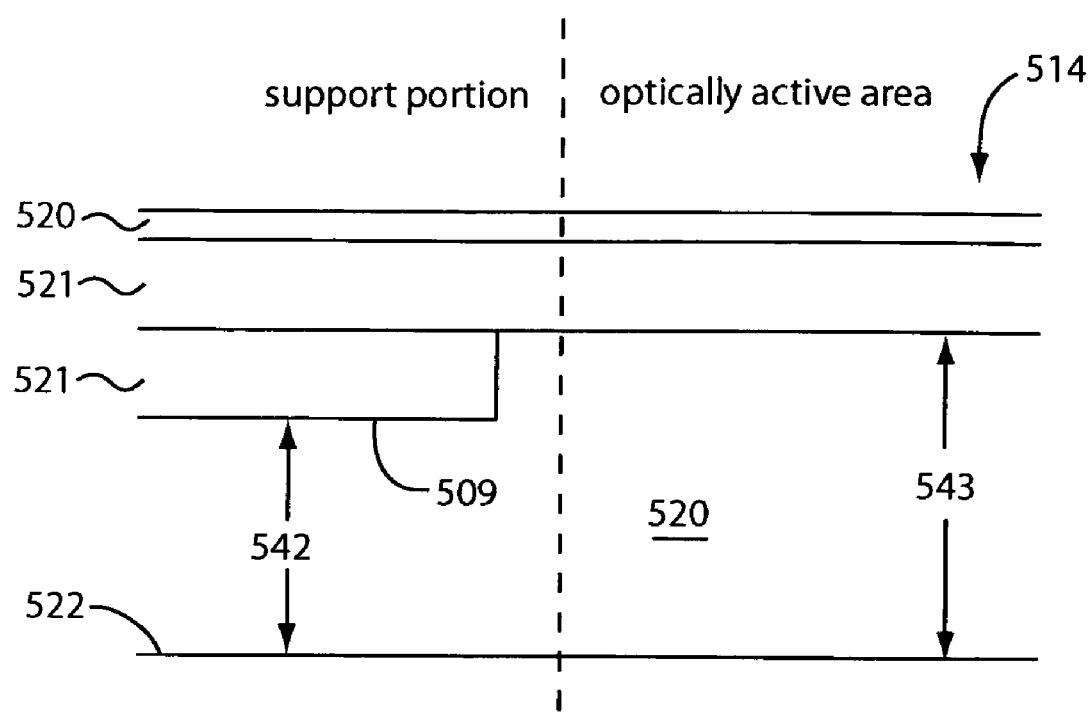

The depressions 508 and projections 509 are preferably outside the optically active area. This results in a projection 509 having a gap distance less than that of a lower surface of the ribbon 512 under the optically active area. That is, the exposed surface of the projection 509, which is in the support portion of the ribbon 512, is closer to the substrate 522 than the lower surface (i.e. surface facing the substrate) of the ribbon 512 under the optically active area. FIG. 5D schematically shows a side view of the light modulator 500 as seen in the direction indicated by an arrow 517 in FIG. 5A. As shown in FIG. 5D, a projection 509 results in the gap distance 542 being shorter than a gap distance 543 under the optically active area 514.

A depression on the top surface of the ribbons may be located and sized to correspond to or complement the projection. More preferably, the depressions and projections are located and sized relative to one another to maintain a substantially constant average cross-sectional thickness across a width of the ribbon, in the support portion. Most preferably, the actuator electrode (e.g. reflective material) on the top surface of the ribbon does not extend into or cover the depression in the support portion thereof. Removing the actuator electrodes from the depressions substantially eliminates the potential for snap down of the ribbon under normal operating conditions, which could arise from moving the actuator electrode closer to the substrate or the drive electrode, and allowing near contact movement of the ribbon.

Figure 5E:
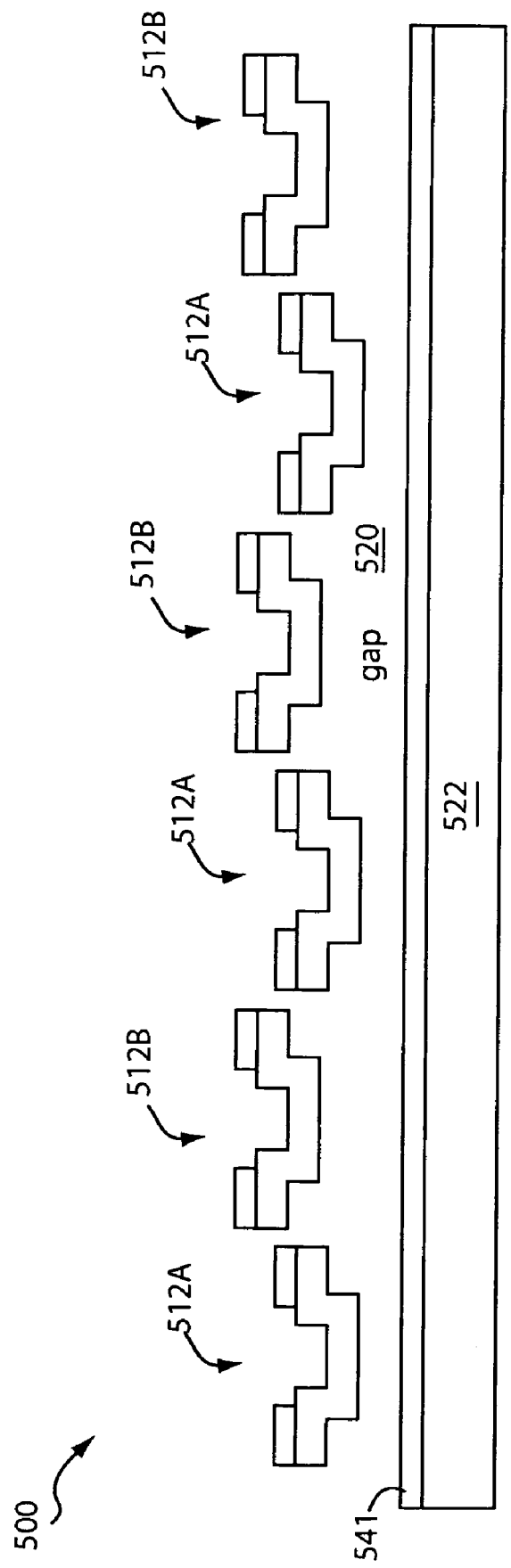

FIG. 5E schematically shows the light modulator 500 when the ribbons 512A are actuated (i.e. in the deflected state). A height difference between adjacent ribbons 512 can be changed by controllably deflecting the active ribbons 512A towards the substrate 522 by up to about $9\lambda/4$ and more typically about $5\lambda/4$, where $\lambda$ is the wavelength of the incident light. If, upon reflection, the light from adjacent ribbons 512 is in phase, then the $0^{th}$ order light reflection is effectively maximized and the light modulator 500 is in an ON state. To minimize the $0^{th}$ order light reflection, the active ribbons 512A are deflected by an odd multiple of the wavelength. When the $0^{th}$ order light reflection is minimized, the light modulator 500 is in an OFF state. The ribbons 512A may be actuated such that the light modulator 500 is ON, OFF, or in between to modulate incident light.

FIGS. 6A–6F schematically illustrate the fabrication of a ribbon-type diffractive spatial light modulator 500 in accordance with an embodiment of the present invention. The fabrication steps of FIGS. 6A–6F are provided herein merely for illustration purposes, not as a limitation. As can be appreciated, the previously described light modulator 500 may be fabricated using any appropriate fabrication process without detracting from the merits of the present invention. FIGS. 6A–6F omit well known steps, such as masking steps, in the interest of clarity.

Figure 6A:
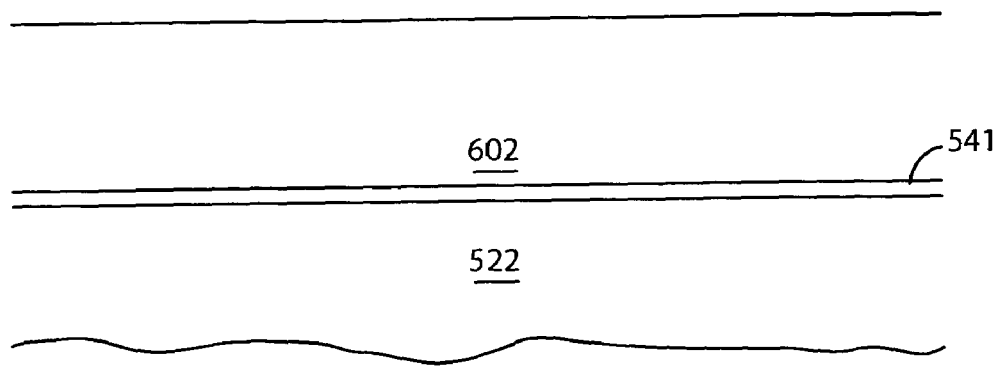
FIGS. 6A, 6B, 6C, 6D, 6E, and 6F schematically illustrate the fabrication of a light modulator in accordance with an embodiment of the present invention.

In FIG. 6A, a conductive layer serving as the drive electrode 541 is formed over the substrate 522. The substrate 522 may comprise a semiconductor (e.g. silicon) substrate, while the drive electrode 541 may comprise a layer of metal or doped polysilicon. In one embodiment, the drive electrode 541 comprises doped polysilicon formed to a thickness of about 3000 to 10000 Angstroms. A relatively thin oxide layer (not shown) may be formed between the drive electrode 541 and the substrate 522. A sacrificial layer 602 is formed over the drive electrode 541. Sacrificial layer 602 may be formed to a thickness of about 2000 to 20,000 Angstroms. Sacrificial layer 602 may comprise a material that is preferentially etched by a noble gas fluoride (e.g. xenon difluoride). For example, sacrificial layer 602 may comprise amorphous silicon.

Figure 6B:
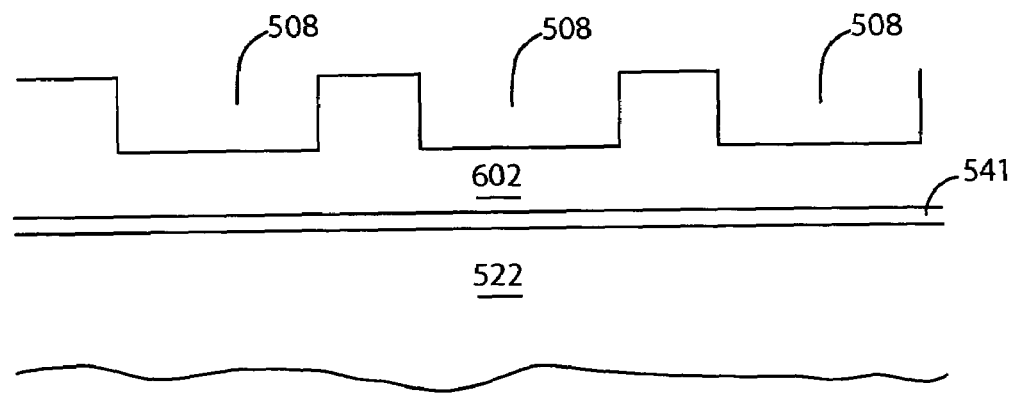

In FIG. 6B, the sacrificial layer 602 is etched to form a pattern for depressions 508. The etching of the sacrificial layer 602 in FIG. 6B may be a timed etch using masks (not shown) formed over the sacrificial layer 602, for example. The sacrificial layer 602 may be etched to a depth of about 1500 to 15,000 Angstroms, for example.

Figure 6C:
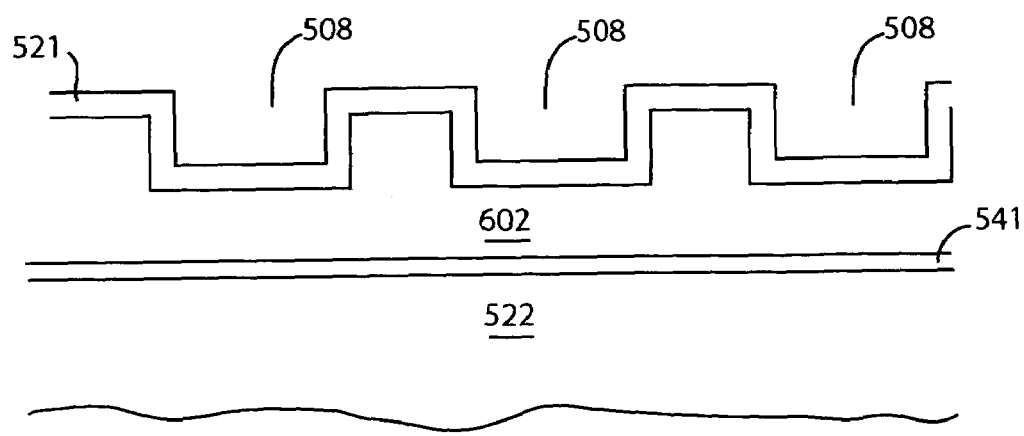

In FIG. 6C, a layer of resilient material serving as resilient structures 521 is formed over the sacrificial layer 602. The resilient material may comprise silicon nitride formed to a thickness of about 500 to 2000 Angstroms, for example.

Figure 6D:
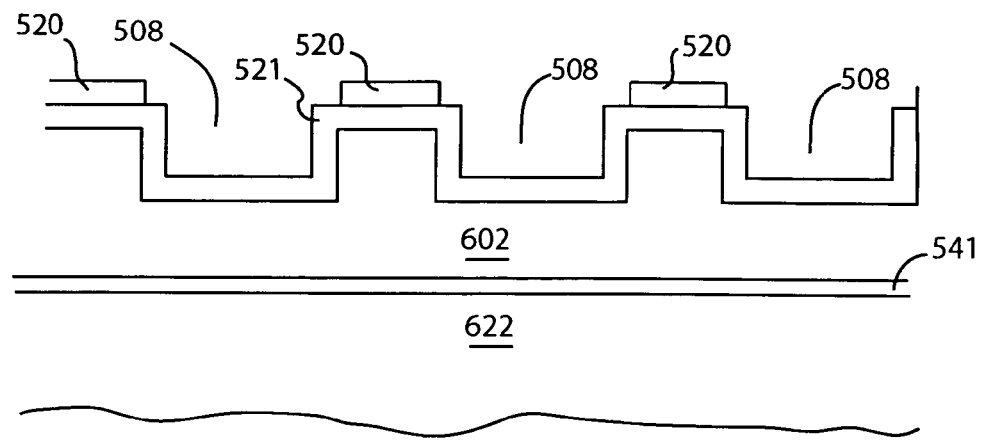

In FIG. 6D, reflective materials 120 are formed on the material of the resilient structures 521. Reflective materials 120 may comprise aluminum formed to a thickness of about 500 to 1000 Angstroms, for example.

Figure 6E:
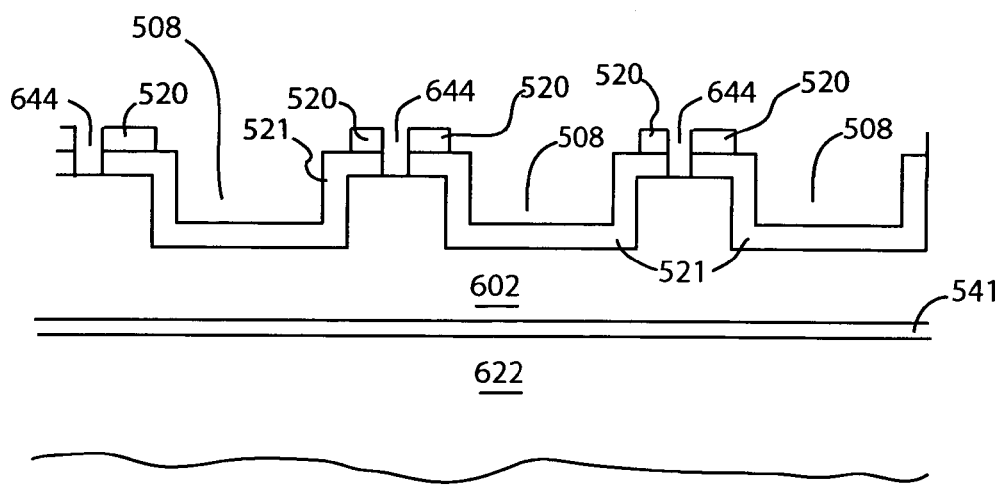

In FIG. 6E, release holes 644 are formed through the reflective materials 520 and the material of resilient structures 521. Release holes 644 allow the sacrificial layer 602 to be exposed to an etchant that will etch the sacrificial layer 602 and release the ribbons 512.

Figure 6F:
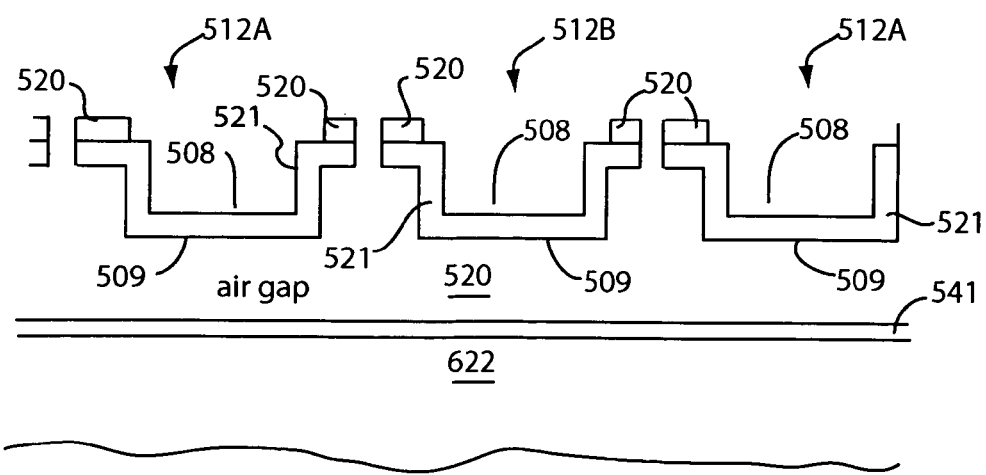

In FIG. 6F, the sample of FIG. 6E is exposed to an etchant to isotropically etch the sacrificial layer 602. In one embodiment, a sacrificial layer 602 comprising amorphous silicon is etched using an etchant comprising a noble gas fluoride, such as xenon difluoride. Etching the entirety of sacrificial layer 602 forms air gap 520 and releases the ribbons 512. Relative to the substrate 522, the gap distance to a projection 509 is shorter compared to that of a lower surface of a ribbon 512 under an optically active area.

Figure 1A:
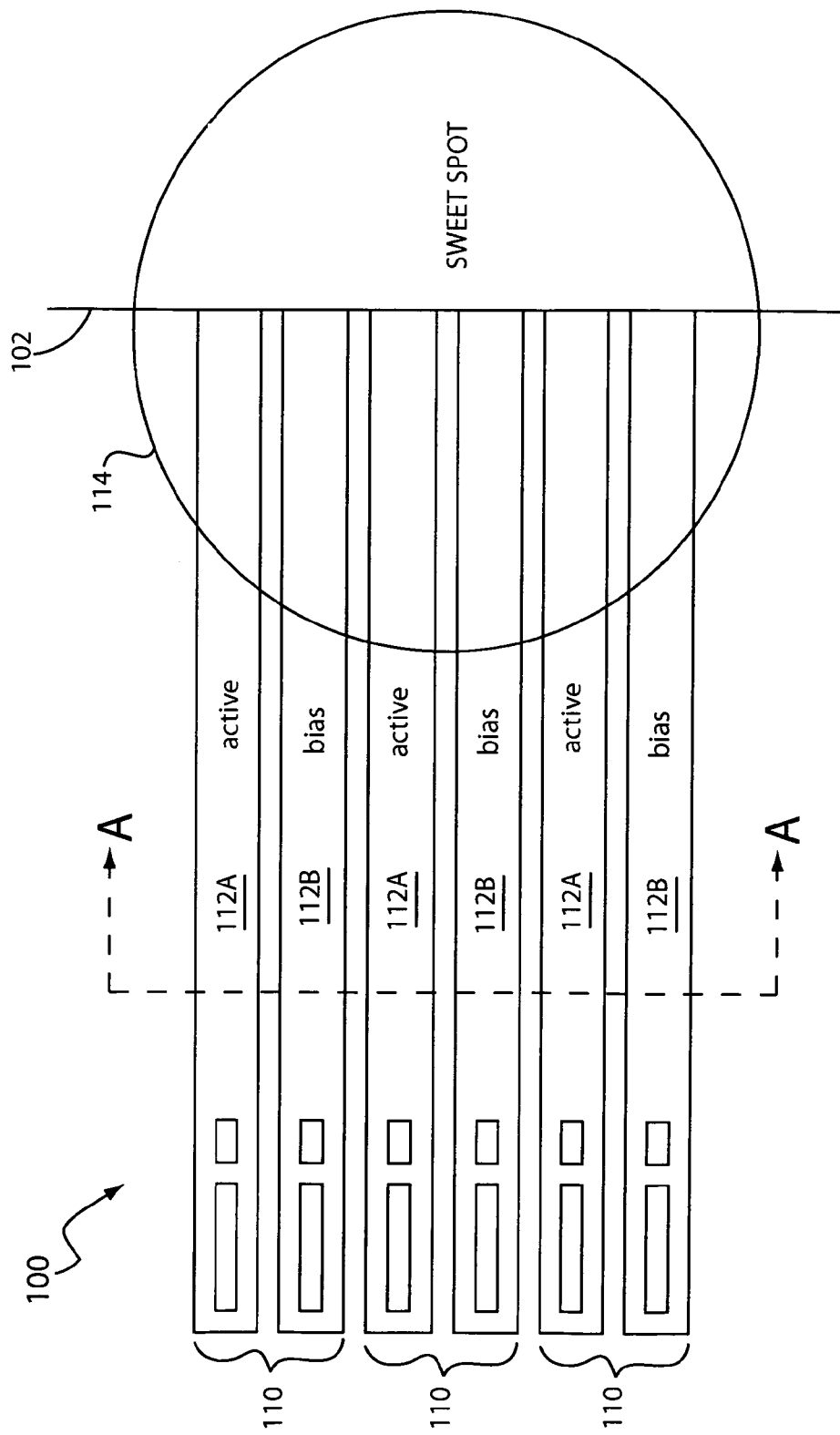
Figure 2:
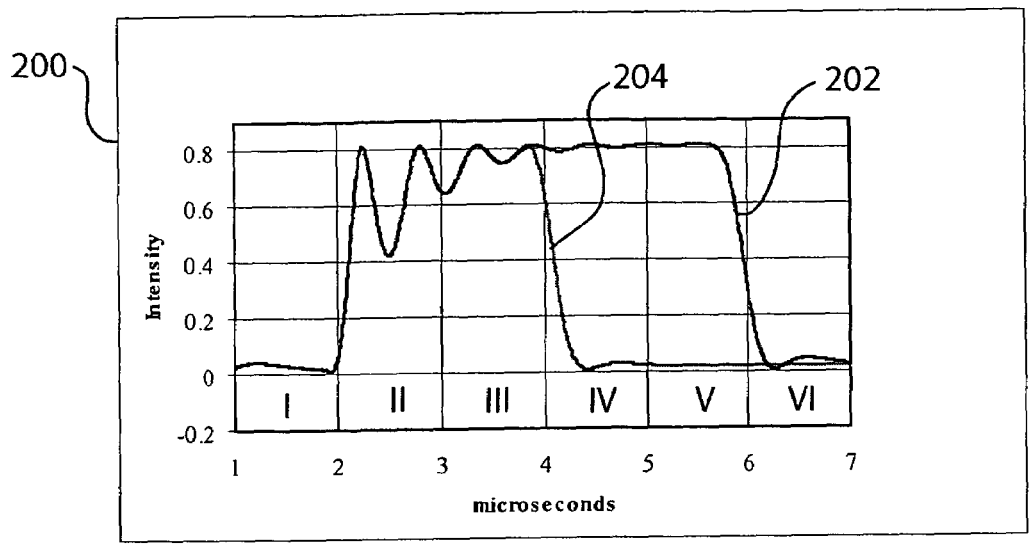
FIG. 2 shows a graph illustrating the impact of damping time on transition from an OFF state to an ON state in a conventional ribbon-type diffractive spatial light modulator.
Figure 3:
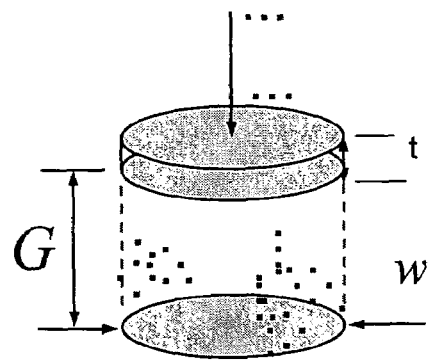
FIG. 3 shows a diagram and a formula illustrating the impact of various characteristics of a ribbon-type diffractive spatial light modulator on damping time.
Figure 4:
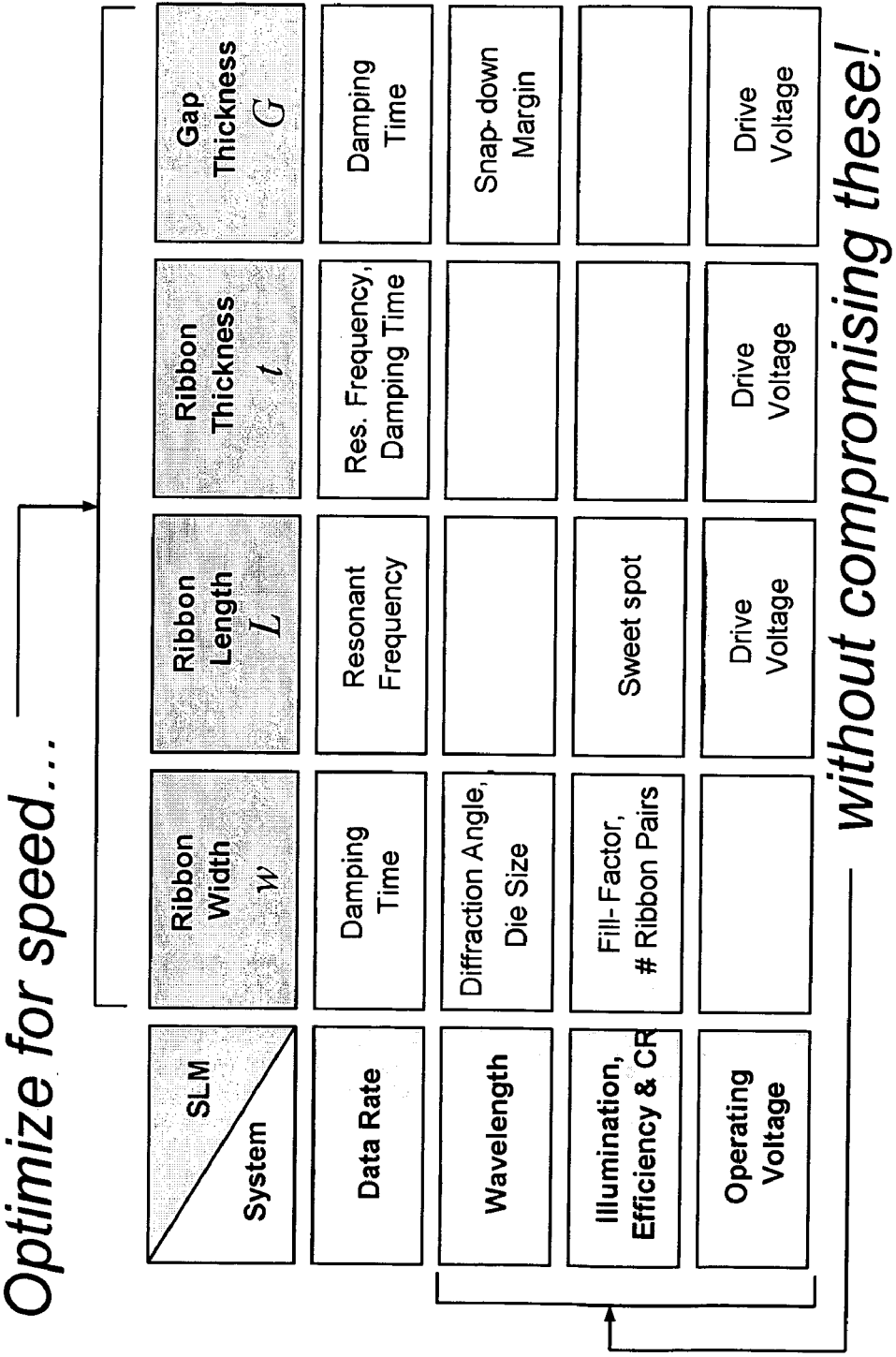
FIG. 4 shows a chart illustrating the tradeoff between optimization of speed realized through decreased damping time and spatial light modulator performance in a conventional ribbon-type diffractive spatial light modulator.
Figure 7:
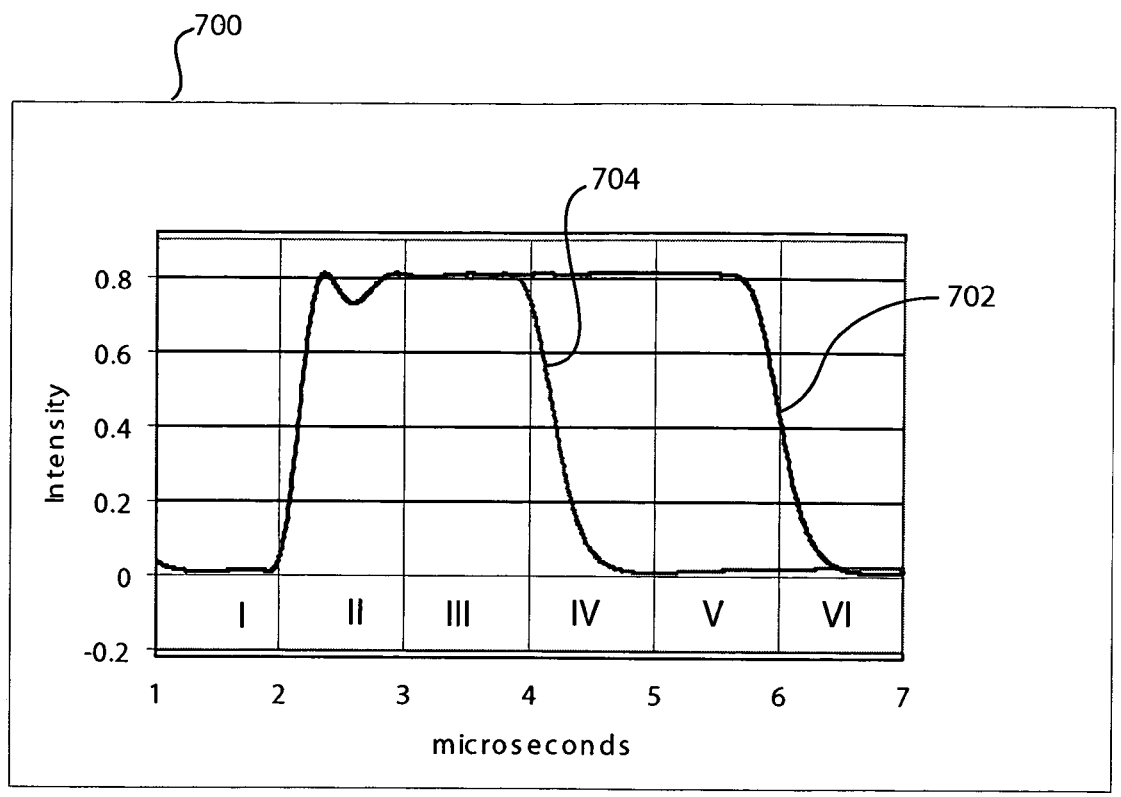
FIG. 7 shows a graph illustrating the minimization of oscillation and the impact on damping and transition time in a light modulator according to an embodiment of the present invention.

It will be appreciated that because damping time has a cubic relationship with gap distance, as illustrated in FIG. 3, the light modulator 500 will provide shorter or faster damping times in transitions from an OFF state to an ON state, and vice-versa. FIG. 7 shows a graph 700 illustrating the minimization of oscillation and the impact on damping and transition time in a light modulator according to an embodiment of the present invention. Plot 704 shows a simulated response of a light modulator with reduced gap distance and having a response time of about 4 microseconds, while plot 702 shows a simulated response of a light modulator with reduced gap distance and having a response time of about 6 microseconds. From FIG. 7, it is seen that regions II and III have similar integrated intensity, thereby providing faster device damping and enabling more uniform pulses at higher speeds.

In light of the present disclosure, those of ordinary skill in the art can appreciate that gap distance under a modulator element may be reduced using other configurations without departing from the scope and spirit of the present invention. For example, FIGS. 8–10 show alternative embodiments for reducing gap distance under a modulator element, and thereby shorten damping time. As can be appreciated, the embodiments shown in FIGS. 8–10 may be fabricated using process steps similar to those of the light modulator 500 or using other suitable fabrication processes without detracting from the merits of the present invention.

FIG. 8A schematically shows a top view of a portion of a ribbon-type diffractive spatial light modulator 700 in accordance with an embodiment of the present invention. Light modulator 700 includes modulator elements in the form of ribbon pairs 710, with each ribbon pair 710 consisting of a deflectable active ribbon 712A and a stationary bias ribbon 712B. The ribbons 712 (i.e. 712A and 712B) are symmetrical about a symmetry line 702. Portions of the ribbons 712 on the right hand side of symmetry line 702 are not shown for clarity of illustration. In operation, a light source illuminates the optically active area 714 (i.e. sweet spot) of the ribbons 712.

In the example of FIG. 8A, active ribbons 712A are configured to deflect, while bias ribbons 712B are configured to remain relatively stationary or fixed. Active ribbons 712A and bias ribbons 712B have uniform dimensions and are covered with the same reflective material. The ribbons 712 also include long anchor regions 704, short anchor regions 706, and depressions 708. Anchor regions 704 and 706 secure the ribbons 712 to the substrate. As will be more apparent below, depressions 708 have complementary projections 709 (see FIG. 8B) that reduce the gap distance between the substrate and the lower surface of the ribbons 712 to shorten damping time.

FIG. 8B schematically shows a side cross-sectional view of the light modulator 700 taken at section C—C of FIG. 8A. Note that only some components shown in FIG. 8B are labeled for clarity of illustration. As shown in FIG. 8B, each ribbon 712 (712A or 712B) may comprise a reflective material 720 supported by a resilient structure 721. A gap separates the ribbons 712 from a substrate 722. On top of the substrate is a drive electrode 741. The reflective materials 720 may be configured as actuator electrodes. Applying a potential difference between the drive electrode 741 and the reflective materials 720 creates an electrostatic force that deflects the active ribbons 712A toward the substrate 722.

Still referring to FIG. 8B, depressions 708 on a ribbon 712 have a complementary pair of projections 709 formed proximal to the sides of the ribbon 712. Depressions 708 are also formed proximal to the sides of the ribbons 712 and are located and sized to complement their corresponding pair of projections 709. Each pair of projections 709 has long axes in parallel with a long axis of the ribbon 712 to define two projecting or lowered portions of the lower surface in the support portion along sides thereof. Depressions 708 and projections 709 are preferably outside the optically active area. This results in a projection 709 having a gap distance less than that of a lower surface of the ribbon 712 under the optically active area. That is, the lower surface of a ribbon 712 under the optically active is higher than the projections 709 relative to the substrate 722. The projections 709 reduce the gap distance under the resilient structures 721, thereby advantageously shortening damping time. In the example of FIG. 8B, each resilient structure 721 comprises a single layer of resilient material.

In the embodiments of FIGS. 5 and 8, all ribbons of the light modulator are identical to improve $1^{st}$ order dark state. However, as will be appreciated by those skilled in the art, this is not necessary and one or more of the active or bias ribbons may comprise a non-identical area, cross-section or shape to achieve other additional functionalities, without departing from the scope or spirit of the invention. The difference between the ribbons can be implemented in either the support portion or the optically active area, for example. FIGS. 9 and 10 show alternative embodiments where the active and bias ribbons are not identical yet still achieve relatively short damping time due to the reduction of the gap distance in portions of the light modulator other than the optically active area.

FIG. 9A schematically shows a top view of a portion of a ribbon-type diffractive spatial light modulator 900 in accordance with an embodiment of the present invention. Light modulator 900 includes modulator elements in the form of deflectable active ribbons 912A and stationary bias ribbon 912B. The ribbons 912 (i.e. 912A and 912B) are symmetrical about a symmetry line 902. Portions of the ribbons 912 on the right hand side of symmetry line 902 are not shown for clarity of illustration. In operation, a light source illuminates the optically active area 914 (i.e. sweet spot) of the ribbons 912.

In the example of FIG. 9A, active ribbons 912A are configured to deflect, while bias ribbons 912B are configured to remain relatively stationary or fixed. Active ribbons 912A and bias ribbons 912B are typically covered with the same reflective material. The ribbons 912 also include long anchor regions 904 and short anchor regions 906. Anchor regions 904 and 906 secure the ribbons 912 to the substrate. Because bias ribbons 912B remain relatively stationary, they may include additional short anchor regions (labeled as 906A) for additional structural support without affecting mechanics.

In light modulator 900, not all of the ribbons 912 include projections 909 (see FIG. 9B) or depressions 908. Instead the bias ribbons 912B, which do not move, do not include projections or depressions and can be made smaller or thinner in the support portion, thereby enabling the support portion of adjacent active ribbons 912A to be wider. In active ribbons 912A, the depressions 908 have complementary projections 909 that reduce the gap distance between the lower surface of the active ribbons 912A and the substrate to reduce damping time. The lowered and wider support portions of the active ribbons 912A have a more pronounced effect, thereby enabling higher operating speeds.

FIG. 9B schematically shows a side cross-sectional view of the light modulator 900 taken at section D—D of FIG. 9A. Note that only some components shown in FIG. 9B are labeled for clarity of illustration. As shown in FIG. 9B, each ribbon 912 (912A or 912B) may comprise a reflective material 920 supported by a resilient structure 921. A gap separates the ribbons 912 from a substrate 922. On top of the substrate is a drive electrode 941. The reflective materials 920 may be configured as actuator electrodes. Applying a potential difference between the drive electrode 941 and the reflective materials 920 creates an electrostatic force that deflects the ribbons 912A toward the substrate 922.

Still referring to FIG. 9B, a depression 908 on an active ribbon 912A has a complementary projection 909 that makes the lower surface of the active ribbon 912A closer to the substrate 922 to shorten damping time. The depressions 908 and projections 909 are preferably outside the optically active area. This results in a projection 909 having a gap distance less than that of a lower surface of the ribbon 912A under the optically active area. That is, the bottom surface of a ribbon 912A under the optically active area is higher than a projection 909 relative to the substrate 922.

Referring now to FIG. 10A, there is schematically shown a top view of a portion of a ribbon-type diffractive spatial light modulator 990 in accordance with an embodiment of the present invention. Light modulator 990 includes modulator elements in the form of deflectable active ribbons 952A and stationary bias ribbon 952B. The ribbons 952 (i.e. 952A and 952B) are symmetrical about a symmetry line 962. Portions of the ribbons 952 on the right hand side of the symmetry line 962 are not shown for clarity of illustration. In operation, a light source illuminates the optically active area 954 (i.e. sweet spot) of the ribbons 952.

In the example of FIG. 10A, active ribbons 952A are configured to deflect, while bias ribbons 952B are configured to remain relatively stationary or fixed. Active ribbons 952A and bias ribbons 952B are typically covered with the same reflective material. The ribbons 952 also include long anchor regions 954 and short anchor regions 956. Anchor regions 954 and 956 secure the ribbons 912 to the substrate. Because bias ribbons 952B remain relatively stationary, they may include additional short anchor regions (labeled as 956A) for additional structural support without affecting mechanics.

In light modulator 990, not all of the ribbons 952 include projections 959 (see FIG. 10B) or depressions 958. Instead the bias ribbons 952B, which do not move, do not include projections or depressions and can be made smaller or thinner in the support portion, thereby enabling the support portion of adjacent active ribbons 952A to be wider. In active ribbons 952A, the depressions 958 have complementary projections 959 that reduce the gap distance between the lower surface of the active ribbons 952A and the substrate to reduce damping time. The lowered and wider support portions of the active ribbons 952A have a more pronounced effect, thereby enabling higher operating speeds.

Still referring to FIG. 10B, depressions 958 on an active ribbon 952A have a complementary pair of projections 959 formed proximal to the sides of the active ribbon 952A. Depressions 958 are also formed proximal to the sides of the active ribbon 952A and are located and sized to complement their corresponding pair of projections 959. Each pair of projections 959 has long axes in parallel with a long axis of the active ribbon 952A to define two projecting or lowered portions of the lower surface in the support portion along sides thereof. Depressions 958 and projections 959 are preferably outside the optically active area. This results in a projection 959 having a gap distance less than that of a lower surface of the active ribbon 952A under the optically active area. That is, the bottom surface of an active ribbon 952A under the optically active is higher than the projections 959 relative to the substrate 972. The projections 959 reduce the gap distance under a resilient structure 971 of an active ribbon 952A, thereby advantageously shortening damping time. In the example of FIG. 10B, each resilient structure 971 comprises a single layer of resilient material.

Figure 11:
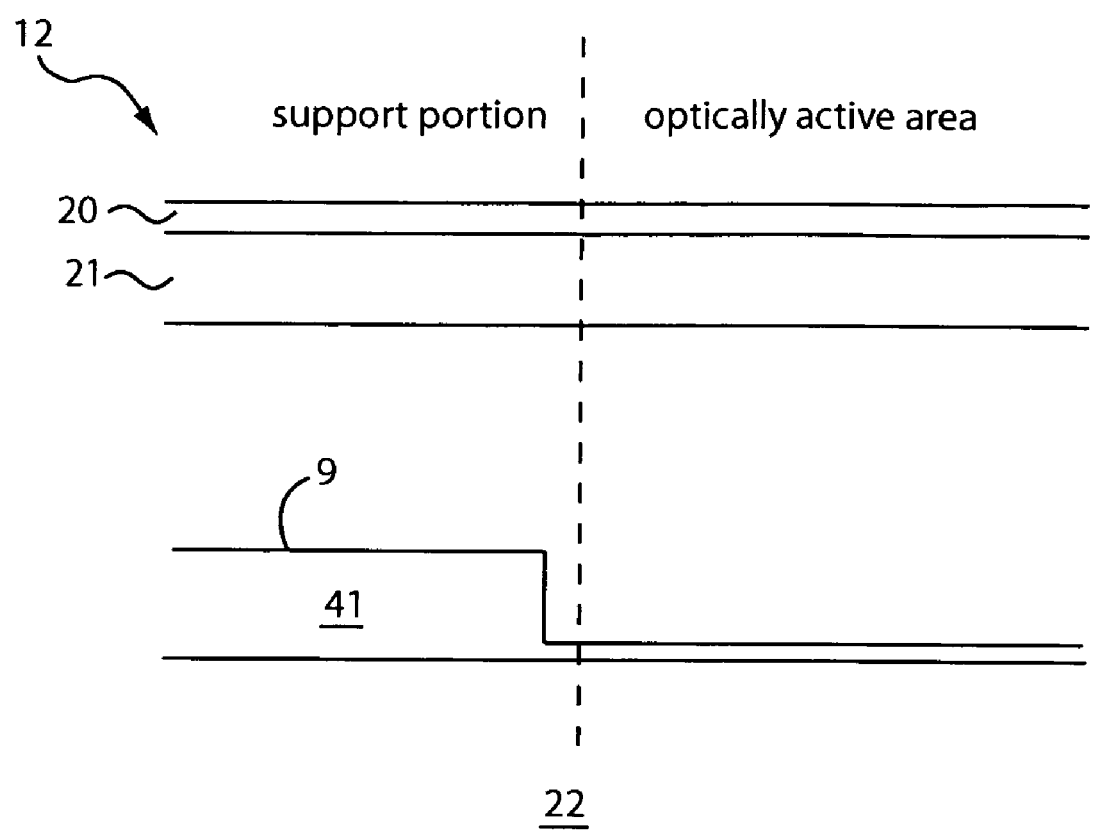
FIG. 11 schematically shows a side view of a light modulator in accordance with a fifth embodiment of the present invention.

In light of the present disclosure, yet more embodiments are possible without departing from the scope and spirit of the present invention. For example, gap distance may be reduced to shorten dampen time by a projection formed on the substrate rather than on an active ribbon. That is, the upper surface of a substrate may comprise at least one projection extending toward the section of the lower surface of the support portion of a ribbon, thereby reducing the gap separating the lower surface of the ribbon in the support portion from the substrate. A side view of an example ribbon 12 with such a feature is schematically shown in FIG. 11, where a projection 9 extends toward the support portion of the ribbon 12. Ribbon 12 comprises a reflective material 20 supported by a resilient structure 21. In the example of FIG. 11, the projection 9 is part of a drive electrode 41, which is formed over the substrate 22. Projection 9 is under the support portion (not the optically active area) of the ribbon 12 to reduce the gap distance and thereby shorten damping time.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A light modulator comprising:
   a substrate having an upper surface;
   a plurality of modulator elements disposed above the upper surface of the substrate and in spaced apart relation thereto, each modulator element having an optically active portion adapted to receive light incident on the light modulator, and a support portion on either side of the optically active portion to support the modulator element above the substrate;
   at least one deflectable modulator element in the plurality of modulator elements, the deflectable modulator element having a lower surface in its support portion that is closer to the substrate than a lower surface of the deflectable modulator element under its optically active portion when the deflectable modulator element is in an undeflected state.

2. The light modulator of claim 1 further comprising:
   a drive electrode formed over the substrate and separated from the lower surface in the support portion of the deflectable modulator element by a gap; and
   wherein the deflectable modulator element further comprises an actuator electrode on a top surface thereof, the deflectable modulator element being configured to deflect towards the substrate upon application of a potential difference between the drive electrode and the actuator electrode.

3. The light modulator of claim 2 further comprising:
a projection extending toward the support portion of the deflectable modulator element, the projection and the deflectable modulator element being separated by the gap, the projection being configured to make the lower surface in the support portion of the deflectable modulator element closer to the substrate than the lower surface of the deflectable modulator element under the optically active portion.

4. The light modulator of claim 2 further comprising:
a projection on the lower surface in the support portion of the deflectable modulator element, the projection being configured to make the lower surface in the support portion of the deflectable modulator element closer to the substrate than the lower surface of the deflectable modulator element under the optically active portion.

5. The light modulator of claim 4 wherein the support portion of the deflectable modulator element further comprises at least one depression on the top surface thereof, and wherein the depression is located and sized to complement the projection.

6. The light modulator of claim 5 wherein the projection and the depression are located and sized relative to one another to maintain a substantially constant average cross-sectional thickness across a width of the deflectable modulator element in the support portion.

7. The light modulator of claim 5 wherein the actuator electrode on the top surface of the deflectable modulator element does not extend into the depression in the support portion thereof.

8. The light modulator of claim 5 wherein the projection comprises a single central projection having a long axis in parallel with a long axis of the deflectable modulator element, and the depression comprises a single central depression having a long axis in parallel with the long axis of the deflectable modulator element.

9. The light modulator of claim 1 wherein the deflectable modulator element further comprises:
a pair of projections proximal to sides of the deflectable modulator element, the pair of projections having long axes in parallel with a long axis of the deflectable modulator element to define two projecting portions of the lower surface in the support portion of the deflectable modulator element, the pair of projections being configured to make the lower surface in the support portion of the deflectable modulator element closer to the substrate than the lower surface of the deflectable modulator element under the optically active portion.

10. The light modulator of claim 9 wherein the support portion of the deflectable modulator element further comprises:
a pair of depressions proximal to sides of the deflectable modulator element located and sized to complement the pair of projections.

11. A method of operating a MEMS light modulator, the method comprising:
providing a deflectable active ribbon and a stationary bias ribbon, the active and bias ribbons being separated from a substrate by a gap, the active ribbon comprising a reflective material supported over the substrate by a resilient structure, the active ribbon having a support portion and an optically active portion, a lower surface in the support portion having a first projection configured to make the lower surface in the support portion closer to the substrate than a lower surface of the active ribbon under the optically active portion;
illuminating the optically active portion of the active ribbon with light; and
modulating the light by applying a potential difference between the reflective material and a drive electrode formed over the substrate to deflect the active ribbon toward the substrate.

12. The method of claim 11 wherein the lower surface in the support portion further comprises a second projection, the first and second projections forming a pair of projections proximal to sides of the active ribbon and having long axes in parallel with a long axis of the active ribbon.

13. The method of claim 11 wherein the bias ribbon remains relatively fixed when the active ribbon is deflected toward the substrate.

14. The method of claim 11 wherein the active ribbon further comprises a depression on an upper surface of the support portion, the depression being sized and located to complement the first projection.

15. A MEMS light modulator comprising:
a plurality of deflectable ribbons suspended over a substrate, the plurality of deflectable ribbons including at least one deflectable ribbon having an optically active portion and a support portion on an end of the optically active portion, the optically active portion being configured to be illuminated with incident light, the deflectable ribbon having a resilient structure supporting an actuator electrode over the substrate, the resilient structure comprising a single material and having a lower surface in the support portion and a lower surface under the optically active portion, wherein the lower surface in the support portion is closer to the substrate than the lower surface under the optically active portion;
a drive electrode formed over the substrate and separated from the resilient structure by a gap, wherein the deflectable ribbon is configured to be deflected towards the substrate by applying a potential difference between the actuator electrode and the drive electrode.

16. The light modulator of claim 15 further comprising:
a plurality of stationary ribbons suspended over the substrate, the plurality of stationary bias ribbons being located alternately with the plurality of deflectable ribbons, the plurality of stationary ribbons being configured to remain fixed while the plurality of deflectable ribbons are deflected towards the substrate by electrostatic force.

17. The light modulator of claim 15 wherein the resilient structure is formed with a projection in the support portion, the projection having a surface that is closer to the substrate than the lower surface of the resilient structure under the optically active portion.

18. The light modulator of claim 17 wherein the resilient structure is formed with a depression that is sized and located to complement the projection.

19. The light modulator of claim 15 wherein the resilient structure is formed with a pair of projections having long axes in parallel with a long axis of the deflectable ribbon, the pair of projections having lower surfaces that are closer to the substrate than the lower surface of the resilient structure under the optically active portion.

20. The light modulator of claim 19 wherein the pair of projections is proximal to sides of the resilient structure.

* * * * *